United States Patent Office 2,844,522
Patented July 22, 1958

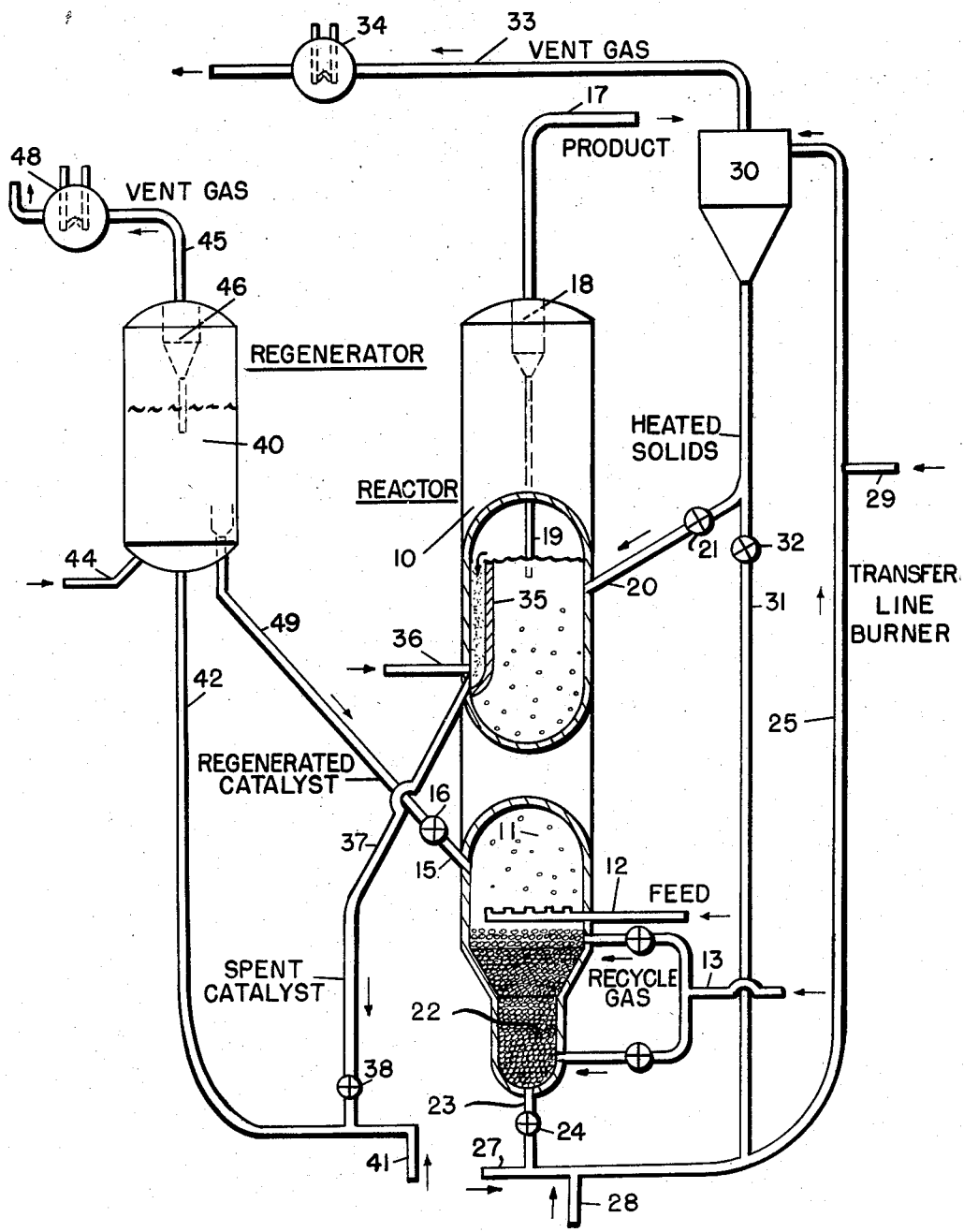

2,844,522

METHOD OF HEAT SUPPLY FOR A CATALYTIC HYDROFORMING PROCESS THROUGH THE USE OF INERT HEAT-CARRYING MATERIAL

Walter A. Rex, Westfield, and Charles E. Jahnig, Red Bank, N. J., assignors to Esso Research and Engineering Company, a corporation of Delaware Application December 31, 1952, Serial No. 328,842

8 Claims. (Cl. 196—52)

The present invention relates to improvements in the catalytic conversion of hydrocarbon fractions, and particularly to the conversion of hydrocarbon fractions within the naphtha boiling range and having a low knock rating to produce high octane number motor fuels. More specifically, the invention relates to an improved process for upgrading naphtha hydrocarbons by catalytic hydroforming or aromatization processes, employing a fluidized solids reactor system.

Hydroforming and aromatization are chemically related processes which are well known and widely used for treating hydrocarbon fractions boiling in the motor fuel range. Their purpose, broadly speaking, is to convert straight chain and naphthenic hydrocarbons into branched chain and aromatic products of roughly the same molecular weight and volatility. The conversion products obtained in this way have greatly enhanced value as motor fuels, because of their improved anti-knock quality and, in some cases, because of improved volatility.

The hydroforming process, for example, may be used to convert a naphthenic heavy naphtha of poor octane quality and low volatility into a motor fuel of premium octane quality and improved volatility, containing a very substantial proportion of the total product as material in the aviation gasoline boiling range. The hydroforming operation is a catalytic process which includes a variety of dehydrogenation, cyclization, hydrogen transfer, isomerization, dealkylation and aromatization reactions. There is a net production of hydrogen and a significant increase in aromatics content, with the particular reactions which take place depending on the character of the feed stock and the operating conditions employed. The net production of hydrogen and aromatics means that the overall reaction is endothermic in character, requiring some means for continuously supplying the necessary heat of reaction.

The term "aromatization" refers broadly to any process carried out in the presence or absence of hydrogen which results in the formation of aromatics from non-aromatic hydrocarbons. The aromatization of segregated naphthenes or olefinic compounds is well known. The most desirable process, however, is one which does not require careful and expensive feed preparation. Since the naphthenes, and particularly the cyclohexane derivatives, are easily converted into aromatics, processes which permit the conversion of paraffins or mixed paraffin-naphthene stocks to aromatics are particularly important.

Regardless of the feed stock, both hydroforming and aromatization consist essentially of dehydrogenation type reactions, and the processes are characteristically endothermic. The catalysts suitable for these operations are well known. They consist ordinarily of compositions such as molybdenum oxide or chromium oxide supported on a base or spacing agent such as alumina gel, an activated or promoted alumina, or a zinc aluminate spinel. Other oxides and sulfides of metals of groups 4, 5, 6 and 8 of the periodic system may be used as such, or after previous sulfiding or reduction to the free metal or to a lower oxidation state, in such a manner as may be known in the art for the individual catalyst. In the aromatization of a paraffinic feed stock, which requires high severity conditions, pressures for the catalytic conversion may be from atmospheric to at most about 100 lbs./sq. in. Hydroforming conditions employing catalysts of the type described above may be carried out in the pressure range from about 50 to 1,000 lbs./sq. in., with a continually replenished hydrogen atmosphere which is ordinarily supplied by recycling the hydrogen-containing portion of the product stream at the rate of about 500 to 5000 cubic feet per barrel of oil fed. Either the low pressure aromatization or the higher pressure hydroforming reaction may be carried out at temperatures of 750 to 1150° F.

In the ordinary case where saturated hydrocarbons such as paraffins and naphthenes are being treated by catalytic hydroforming, which will be understood hereinafter to include catalytic aromatization, the process is quite strongly endothermic. This means that large amounts of heat must be supplied to maintain the catalytic conversion zone at the desired temperature level. The problem of constructing apparatus to satisfy this requirement is seriously complicated by the fact that the catalysts employed have very poor heat transfer properties. Thus, heat applied to one portion of a fixed solid mass of discrete catalyst particles flows only slowly to other portions of the mass. This means that in the ordinary fixed bed reactor, the heat of reaction is taken largely from the flowing stream of reactant and product vapors. The inlet temperature of such a hydroforming reactor at, say, 900° F. will, therefore, fall off rapidly to a temperature which may be 150° or even 250° F. lower at the exit point from the catalyst bed. The catalyst, of course, is nothing like as active at these lower temperatures.

Unfortunately, in the attempt to correct this defect and improve the conversion in the catalyst bed by raising the average bed temperature, an increase in inlet temperature to a substantially higher level approaching 1,000° F. or above causes very poor selectivity in the catalytic reaction at the initial reaction portion, where the feed is so hot that some thermal decomposition takes place.

The application of the fluidized solids technique to the hydroforming process offers several real advantages in handling this problem of heat supply. One immediate effect of the high degree of turbulence and mixing of the solid particles within the bed is that the temperature within the bed is equalized, so that the normal gradient or temperature drop observed in the fixed bed reactor is erased. Another important effect is that heat supplied anywhere to the catalyst bed is distributed promptly and uniformly throughout. Such heat may be supplied either by reactant vapors, or with a recycle stream of hydrogen-containing gas which is employed in the hydroforming process, or in any other suitable manner.

A particular advantage in the fluid bed type of hydroforming reaction appears in the possibility of supplying heat to the reaction by recirculating to the reaction zone a hot inert solid heat carrier. Various proposals to utilize this type of operation have been made. In general, the source of heat has been the regenerator, with the heat-carrying solid recirculated at an independent rate from the regenerator into the reactor and back again to control the rate of heat supply.

The ultimate source of the heat thus used has been first of all the heat of combustion of carbonaceous solids deposited on the catalyst during the catalytic reaction. When necessary, this has been augmented by the injection of an extraneous fuel or combustible gas into the regenerator together with the combustion air supply. In this way the regenerator continues to serve as the heating zone with both the regenerated catalyst and heat carrier being heated in the same vessel and recycled to the reactor.

This method of heat supply has been found to have certain important disadvantages, particularly with respect to its effect on the catalyst. First, it must be recognized that coke on the catalyst is inherently undesirable, and practically always kept to the minimum. Even its use as a source of heat is uneconomical, when it is considered that this represents the degradation of a prime quality feed to fuel value. A waste gas or other fuel of no other intrinsic value would serve as well as a source of heat. Accordingly, in an operation of the type described above, the tendency is always to minimize the amount of heat realized in the regenerator from coke on the catalyst, and to balance this by adding extraneous fuel. Typically, therefore, the regenerator in such an operation should be considered as a burner as well as a catalyst combustion zone. This means that the amount of combustion gas passing through the regenerator will ordinarily be more than that required for the regeneration process itself.

The disadvantages which this entails derived partly from the effects of the resulting high gas rates, and partly from this factor combined with the effects of relatively large amounts of heat carrying solid particles circulating through the regenerator. The presence of either the catalyst or an inert heat carrier of this type in a zone where the other is being heatd by combustion is frequently found to have an undesirable effect on the proper functioning of either part of the process. Thus, for example, the presence of the catalyst means that more care must be used in heating the inert solid, or the presence of the inert may lead to an increase in attrition or contamination of the catalyst.

An object of the present invention is to supply heat to an endothermic reaction using a fluidized catalyst by means of a relatively inert coarse solid heated separately from the catalyst cycle, and then introduced directly into the fluid bed in the reaction zone. It is a further object to provide a simple means of heating and effecting the recirculation of the heat-carrying solid which avoids the injection of an extraneous fuel supply into the regeneration zone. It is a still further object to accomplish the recirculation of such a heat-carrying solid by subjecting it to the carrying action of a stream of combustion gases which serves to return the heated solid for reuse in the heating cycle.

The provision of a separate heating cycle means first that the catalyst in the regenerator is not subjected to the grinding action of a relatively large amount of coarse particles recirculating therethrough to remove excess heat. While the catalyst particles used in a fluid hydroforming operation, for example, are made on an attrition-resistant base a high degree of mechanical stability is not entirely consistent with the porous adsorptive nature of the material necessary to get a highly active catalyst. Some attrition is always encountered. Attrition losses are aggravated by the presence of large particles of any sort, and particularly so in the presence of these particles in large excess. The effect of this grinding action on catalyst losses is independent of but added to the increased catalyst losses which will be incurred by the simple entrainment of more catalyst particles in the extra combustion gases vented from the regenerator, when an extraneous fuel supply is being employed.

Removing the inert solid heating from the regenerator cycle means that this vessel can be made smaller. This is an important saving, especially when the heating of the inert solid can be done in a simple transfer line according to the present invention. A separate heating in this way also allows the inert solid to be heated to a higher temperature or with a sharper temperature gradient than can be allowed in the presence of the catalyst. The absolute necessity of avoiding even temporary overheating of the highly active catatlyst particles means that not only the ultimate temperature level but also the rate of heat input and any localized heating effects must be carefully controlled, so as to avoid excess temperature levels regardless of the total heat input. This limitation does not apply to the inert heat carrying solid, however. The problem of supplying heat to this solid is greatly simplified, therefore, by carrying out this part of the heating process in the absence of the catalyst.

Another important factor is that when the separate heating cycle of the present invention is employed the supply of heat to the reactor is no longer tied to anything taking place in the regenerator, with respect to the supply of carbonaceous material removed from the reactor or in any other way.

A still further advantage of the use of a separate heating cycle is the fact that a major portion of the air supplied to support the combustion procecss in the solids transfer line may be at a lower pressure than that employed in the catalyst regeneration. This results in important economies in construction of plant and operating cost since the cost of compressing the air is a major item.

The heat carrying solid employed should be one which has a minimum of catalytic activity. It may be an inert refractory material such as a dead-burned alumina, the variety of aluminum silicate known as mullite, or in other cases a portion of the same material used as a catalyst carrier which has been steam treated at high temperatures so as to substantially completely destroy its free surface area and catalytic activity. The particles are preferably substantially spherical, to minimize attrition and grinding effects both on the particles themselves and on the catalyst with which they are associated. The particle size should be one which is easily separated from the catalyst, which dictates particles larger than about 300 microns in diameter when using a catalyst in the ordinary size range of about 20 to 100 microns in diameter. Too large a size range for the inert solids is likewise undesirable, since very large particles do not transfer their heat to the catalyst bed as readily. It also requires the use of higher velocities of air or gas to move the particles in any circulating conduit. The largest practical size is about 2000 microns from this point of view, although particles much larger than about 700 microns may require excessive transport velocities resulting in some increase in such problems as line pressure drop and erosion. An optimum size range is about 400 to 500 microns from the standpoint of settling rate in the reactor and ease of separation in the catalyst from the bottom of the reactor, without interfering with the good fluidization of catalyst in the reactor fluid bed. The exact size range of the inert solids may change somewhat with the rate of inert circulation, since at higher circulation rates a little larger size might be required in order to get more rapid settling.

The material of which the inert heat-carrying solid is composed may be of substantially the same chemical composition as the catalyst carrier, as indicated above. In that case it may have approximately the same particle density as the catalyst, and any residual catalytic activity will be at least similar in character to the activity of the catalyst. In other cases material of much higher density may be employed, such as a metal shot, so as to have more heat-carrying capacity per unit volume. The optimum particle size range will then be somewhat smaller than the limit shown. The metal to be used in this way will be chosen on the general principle of causing a minimum amount of undesirable degradation of the hydrocarbon feed or product streams in case the solid is not completely inert. Such metals as aluminum, copper, Monel, iron or silver have been found particularly useful in certain cases.

The process of the present invention may be better understood by reference to the accompanying drawing, which presents a diagrammatic illustration of one apparatus suitable for its use. In the drawing, reactor 10 contains a fluid bed of catalyst 11, which is maintained as a turbulent fluid bed by the continuous supply of reactant gases introduced through lines 12 and 13, and regenerated catalyst introduced through line 15 at a rate controlled by valve 16. Product vapors from the catalyst reaction in vessel 10 are removed overhead through line 17 by way of a solids gas separating device such as a cyclone separator 18 which removes and returns entrained catalyst particles into the fluid bed by way of dip line 19.

Heat is supplied to the catalyst in bed 11 by way of a stream of hot inert solid particles introduced directly into the fluid bed by way of line 20, which enters the reactor at a level somewhat below the top of the fluid bed but may be added at a point nearer the bottom of the reactor. The solid particles thus added settle through the bed, and form a fairly distinct layer 22 at the bottom of the reactor. A portion of this inert solid is continuously withdrawn from this bottom layer through line 23 at a rate controlled by valve 24 and continuously recirculated through line 25 to a level substantially higher than inlet line 20.

The conduit 25 serves as a transfer line burner, in which the solids removed through line 23 are subjected to the action of a combustion gas stream formed by the combustion of air and fuel introduced through lines 27 and 28 respectively. The fuel may be a hydrocarbon gas or oil, or other refinery gas, or even a solid fuel may be used since any fly ash formed is readily vented from the system. Additional air, additional fuel or both may be introduced as desired at one or more higher levels 29, to continue the heating and solids-carrying process. Transfer line 25 discharges into a suitable solids-separating device 30, which may be a cyclone or simple settling chamber. The heated inert particles drop from separator 30 into line 20, where their rate of return into the reactor fluid bed may be controlled by valve 21. Heated solid particles from vessel 30 not returned to the reactor may be recycled through line 31 to the transfer line inlet, at a rate controlled by valve 32, to raise the inlet temperature and ensure sufficiently rapid combustion in the transfer line burner. The combustion gases are vented through line 33, which may be provided with a waste heat boiler 34 for heat recovery.

In applying this process to a hydroforming operation, the reactant gas introduced through line 12 may be a preheated feed stock, and the gas introduced at line 13 may be a preheated hydrogen-containing recycle gas. The gas introduced at line 13 is shown as entering at more than one level, where it functions to strip any catalyst and adsorbed or occluded hydrocarbon present out of the coarser heat-carrying solid. This stripping action is enhanced by reducing the diameter of the reactor at the bottom portion 22 where the inert solid accumulates below the feed inlet line 12 on settling out of the catalyst bed, and two branch lines are shown on the gas line 13 so that the stripping action may be controlled. The velocity of the rising gas stream in this section should not greatly exceed the minimum aeration velocity of the coarse solid particles, to avoid unnecessary turbulence at this point, since minimum fluidity is enough to accomplish the desired aim of stripping out the catalyst particles. Only in rare instances will it be necessary to exceed the minimum aeration velocity of the solid in 22 by a factor of 2, or at most 3.

An entirely separate cycle for catalyst regeneration is shown, in which spent catalyst from the reactor 10 overflows into a withdrawal and stripping well 35, where it may be subjected to the action of a stripping gas such as steam introduced through line 36. Catalyst is withdrawn from the well 35 by way of line 37 at a rate controlled by valve 38, and conveyed to the regenerator 40 with the aid of a gas stream such as air or diluted air introduced by way of line 41 into the transfer line 42. Additional air for the regeneration process may be introduced into the regenerator 40 by way of line 44 if desired. Vent gases from the regeneration process are removed through line 45 by way of a suitable solids gas-separating device such as cyclone 46. Waste heat boiler or heat exchanger 48 may also be supplied to recover heat from this vent gas stream. The rate at which heated inert solid particles are introduced into reactor 10 is thus seen to be entirely independent of anything taking place in regenerator 40.

By-pass line 31 permits the independent recirculation of solids without passing through the reactor, to give further flexibility. The valve 32 is placed in this line at a level high enough to give sufficient but not excessive pressure on the solid being recirculated through the burner line 25.

In the usual case, the amount of catalyst recirculated through the regenerator and back to the reactor by way of the return line 49 may be enough to absorb the heat realized by combustion of the coke deposits in the catalyst, without exceeding the heat-carrying capacity of the regenerated catalyst. However, this may require the recirculation of catalyst at an increased catalyst-to-oil ratio, which is not always desirable. Accordingly, it will be recognized that cooling coils, not shown, may be supplied in regenerator 40 to remove any excess heat realized in the regeneration process and permit operation at a lower catalyst-to-oil ratio. An alternate method of operation not shown would be to remove excess heat produced in the regeneration zone by recirculating to the regenerator a separate stream of the inert solid withdrawn through line 23. Heat-carrying solid introduced into the regenerator in this way would absorb excess heat and be returned together with the regenerated catalyst by way of line 49 and line 15 into the reactor. Even in this case, however, the catalyst in the regenerator would not be subjected to the action of an extraneous fuel combustion process, and heat required beyond that released in the regenerator would be added to the system only in the transfer line burner 25. In most cases the amount of heat released in the regenerator is little if any greater than that which the catalyst can carry. Accordingly, if any regenerator cooling is required, the provision of a cooling surface may be much simpler than setting up a separate solid circulating system, as long as only a little such surface is needed.

The process of the invention will be found particularly attractive when the reaction being carried out in vessel 10 is at a relatively low pressure level, such as about 50 p. s. i. g. Under these conditions, air blowers can be used to compress the air supply for the regeneration and combustion processes. By taking a pressure drop of 10 to 20 pounds across valve 24, the air pressure required at line 27 will be only 30 to 40 pounds, and the air pressure required at line 29 will be still lower.

With higher pressure drop on valve 24 the air pressure required at 27 is further reduced. Also, the pressure head of the catalyst bed 11 and the coarse solid bed 22 may be utilized to flow the insert particles from line 23 as a dense fluid stream up to an elevation above the bottom of line 25, so that its pressure may be still further reduced before adding the major air stream or streams.

The vessel 30 may be relatively small compared to the size of regenerator 40, so that it may be placed at a higher elevation at relatively little expense to give the necessary elevation above the bed level in vessel 10, and permit the build-up in the standpipe above inlet line 20 of whatever pressure is necessary to effect the recirculation of the hot inert solid into the reactor.

It will be understood that either air or a combustible gas alone may be used, or either in excess in the presence of the other, for the first part of the solids transport in line 25. The choice depends in part on whether the solid leaving the reactor through line 23 contains carbonaceous material or not, and upon the pressure at which combustion air is to be supplied to the transfer line burner.

What is claimed is:

1. The method of supplying heat to an endothermic hydroforming process for the catalytic treatment of a hydrocarbon feed stock involving the use of a finely divided solid catalyst containing particles within the size range of about 20 to 100 microns in diameter, which comprises maintaining said catalyst in the form of a turbulent fluid bed within a deep reaction zone by upflowing vapor, continuously introducing into said fluid bed relatively coarse solid particles of hot inert heat-carrying material having at least the same particle density as the fluidized catalyst and a particle diameter within the range from about 300 to 700 microns, continuously removing from the bottom of the said reaction zone a stream of said coarse solid particles stripped substantially free of catalyst and hydrocarbon vapors, conveying said coarse particles upwardly through a vertically disposed conduit by the carrying action of a burning stream of air and combustible fuel, simultaneously heating said coarse solid particles in said conduit while conveying them to an upper level, separating the hot coarse solids from the conveying gas stream at said upper level and returning said hot coarse solids downwardly therefrom into a point within said reaction zone below the bed level of the fluidized catalyst maintained therein.

2. The method according to claim 1 in which said coarse solid particles are withdrawn from the bottom of said reaction zone through a stripping section of restricted cross-sectional area wherein they are subjected to the action of a stripping gas passing upwardly into the reaction zone at a velocity no greater than 3 times the minimum aeration velocity of said particles.

3. The method according to claim 2 in which said stripping gas velocity is approximately the minimum aeration velocity required to fluidize said coarse solid particles.

4. The method according to claim 2 in which a stream of said coarse solid particles fluidized by the action of said stripping gas is continuously withdrawn and then passed upwardly as a dense fluid stream to a higher level at a correspondingly lower fluid pressure, and combustion air is introduced into the stream at said lower pressure level.

5. The method according to claim 4 in which a combustible gas is used for aeration to maintain fluidity in the rising portion of said dense fluid stream of coarse solid particles.

6. The method according to claim 4 in which a small amount of relatively high pressure air is used for aeration to maintain fluidity in the rising portion of said dense fluid stream of coarse solid particles.

7. The method according to claim 1 in which said hydrocarbon feed is injected at a level near the bottom of said fluid bed of catalyst, and the level of said coarse solids settling at the bottom of the catalytic reaction zone is continuously held below the level of said feed injection.

8. The method of supplying heat to an endothermic hydroforming process for the catalytic treatment of a hydrocarbon feed stock involving the use of a finely divided solid catalyst containing particles within the size range of about 20 to 100 microns in diameter, which comprises maintaining said catalyst in the form of a turbulent fluid bed within a deep reaction zone by upflowing vapor, continuously introducing into said fluid bed relatively coarse solid particles of hot inert heat-carrying material having at least the same particle density as the fluidized catalyst and a particle diameter within the range from about 300 to 700 microns, continuously removing from the bottom of the said reaction zone a stream of said coarse solid particles stripped substantially free of catalyst and hydrocarbon vapors, conveying said coarse particles upwardly through a vertically disposed conduit by the carrying action of a burning stream of air and combustible fuel, simultaneously heating said coarse solid particles in said conduit while conveying them to an upper level, separating the hot coarse solids from the conveying gas stream at said upper level and returning at least a portion of said hot coarse solids downwardly therefrom into a point within said reaction zone below the bed level of the fluidized catalyst maintained therein, withdrawing finely divided catalyst from an upper level of the said fluid bed substantially free of the said inert heat carrying solids, separately regenerating said catalyst, and returning regenerated catalyst to the said fluid bed.

References Cited in the file of this patent

UNITED STATES PATENTS

| | | |
|---|---|---|
| 2,325,136 | Kassel | July 27, 1943 |
| 2,325,516 | Holt et al. | July 27, 1943 |
| 2,377,512 | Page | June 5, 1945 |
| 2,393,636 | Johnson | Jan. 29, 1946 |
| 2,441,170 | Rose et al. | May 11, 1948 |
| 2,446,247 | Scheineman | Aug. 3, 1948 |
| 2,464,616 | Schwarzenbek et al. | Mar. 15, 1949 |
| 2,582,246 | Garbo | Jan. 15, 1952 |
| 2,721,167 | Nicholson | Oct. 18, 1955 |
| 2,725,341 | Gornowski | Nov. 29, 1955 |
| 2,736,687 | Burnside et al. | Feb. 28, 1956 |